United States Patent [19]

Prasad et al.

[11] Patent Number: 5,852,925
[45] Date of Patent: Dec. 29, 1998

[54] METHOD FOR PRODUCING OXYGEN AND GENERATING POWER USING A SOLID ELECTROLYTE MEMBRANE INTEGRATED WITH A GAS TURBINE

[75] Inventors: Ravi Prasad, East Amherst; Christian Friedrich Gottzmann, Clarence; Raymond Francis Drnevich, Clarence Center, all of N.Y.

[73] Assignee: Praxair Technology, Inc., Danbury, Conn.

[21] Appl. No.: 933,248

[22] Filed: Sep. 18, 1997

Related U.S. Application Data

[62] Division of Ser. No. 490,362, Jun. 14, 1995, abandoned.

[51] Int. Cl.$^6$ ....................................................... F02G 3/00
[52] U.S. Cl. ........................ 60/39.02; 60/39.07; 60/39.52; 95/45; 95/55
[58] Field of Search ................................ 60/39.02, 39.07, 60/39.182, 39.461, 39.465, 39.52; 95/45, 55

[56] References Cited

U.S. PATENT DOCUMENTS

| | | | |
|---|---|---|---|
| 3,731,495 | 5/1973 | Coveney | 60/39.182 |
| 4,330,633 | 5/1982 | Yoshisato et al. | 501/152 |
| 4,545,787 | 10/1985 | Hegarty | 55/16 |
| 4,685,287 | 8/1987 | Takuma | 60/39.07 |
| 5,035,727 | 7/1991 | Chen | 55/16 |
| 5,118,395 | 6/1992 | Chen et al. | 204/59 |
| 5,169,415 | 12/1992 | Roettger et al. | 60/39.07 |
| 5,174,866 | 12/1992 | Chen et al. | 204/59 |
| 5,245,110 | 9/1993 | Van Dijk et al. | 585/946 |
| 5,281,253 | 1/1994 | Thompson | 95/45 |
| 5,398,497 | 3/1995 | Suppes | 60/39.05 |
| 5,447,555 | 9/1995 | Yee et al. | 95/54 |
| 5,459,994 | 10/1995 | Drnevich | 60/39.02 |
| 5,516,359 | 5/1996 | Kang et al. | 95/14 |
| 5,562,754 | 10/1996 | Kang et al. | 95/54 |
| 5,565,017 | 10/1996 | Kang et al. | 95/14 |
| 5,586,429 | 12/1996 | Kesseli et al. | 60/39.07 |
| 5,643,354 | 7/1997 | Agrawal et al. | 75/490 |
| 5,657,624 | 8/1997 | Kang et al. | 60/39.02 |

FOREIGN PATENT DOCUMENTS 0658366  6/1995  European Pat. Off. .

OTHER PUBLICATIONS

Mazanec, T. J., "Electropox: BP's Novel Oxidation Technology", The Activation of Dioxygen and Homogeneous Catalytic Oxidation, pp. 85–96 Plenum Press, N.Y. (1993).

Suitor, J. W., Clark, D. J., Losey, R. W., Development of Alternative Oxygen Production Source Using A Zirconia Solid Electrolyte Membrane, JPL Publication, pp. 68–73 (1990).

Primary Examiner—Timothy Thorpe
Assistant Examiner—Ted Kim
Attorney, Agent, or Firm—Douglas E. Denninger

[57] ABSTRACT

A compressed, oxygen-containing gas stream is combusted and then contacted with a solid electrolyte membrane to produce an oxygen-depleted, compressed gas stream and product oxygen. Preferably, the oxygen-depleted gas stream is further combusted, used to produce steam, and/or used to preheat the oxygen-containing gas stream prior to expansion in a gas turbine.

16 Claims, 6 Drawing Sheets

METHOD FOR PRODUCING OXYGEN AND GENERATING POWER USING A SOLID ELECTROLYTE MEMBRANE INTEGRATED WITH A GAS TURBINE

This application is a Division of prior U.S. application Ser. No. 08/490,362 Filing Date Jun. 14, 1995, now abn.

FIELD OF THE INVENTION

This invention relates to methods for producing oxygen and generating power using a solid electrolyte ionic or mixed conductor membrane integrated with a gas turbine.

BACKGROUND OF THE INVENTION

In gas turbine systems for generating power, feed air is compressed, the compressed air is heated, and thereafter the heated, compressed gas is combusted with a fuel to raise its temperature further, and is subsequently expanded through a turbine to produce power. Oxygen producing equipment has been combined with some of these gas turbine systems to produce oxygen at an incremental cost. Gas turbine power systems have also been combined with steam power generating systems to generate additional power, where the expanded heated gas may also be used to generate steam.

Solid electrolyte ionic or mixed conductor ("SELIC") membranes have been employed to extract oxygen from gases at temperatures within the range of about 500° to about 1000° C. In connection with oxygen extraction from gases, the optimum operating temperature for SELIC membranes is a function of the SELIC membrane itself, particularly the material from which it is constructed. Ionic conductivity is also a function of operating temperature, and increases as the operating temperature increases.

At operating temperatures less than about 500°–650° C., in addition to the lower ionic conductivity of SELIC membranes, their surface kinetic limitations may also constrain oxygen flux—the quantity of oxygen per unit area per unit time. These kinetic limitations result from the conversion into mobile oxygen ions of a gas-phase oxygen Molecule on the feed side of the SELIC membrane, and the conversion into oxygen molecules of oxygen ions on the permeate side thereof Operating temperatures for SELIC membranes greater than about 850°–900° C. are also undesirable because material and construction limitations (such as sealing, manifolding and thermal stress) may be triggered. At operating temperatures typically reached in gas turbines (generally about 1000° to 1200° C.), these limitations become substantially more severe.

Current processes for oxygen production and power generation using SELIC membranes integrated with gas turbines, such as those described in U.S. Pat. Nos. 4,545,787 (Hegarty), 5,035,727 (Chen), and 5,174,866 (Chen et al.), fail to optimize the respective operating temperatures of the gas turbine power generating stage and the SELIC membrane oxygen producing stage.

Indeed, efforts to generate oxygen and produce power using gas turbines and SELIC membranes in a single system have met with only marginal success. One of the reasons for this mediocre performance lies in the operating temperatures used throughout the processes. For instance, where a membrane is operated at a temperature at which a compressor discharges an oxygen-containing stream or at which the exhaust from the turbine is generated, such temperatures are typically either lower or higher, respectively, than desirable for optimum performance from the SELIC membrane.

In U.S. Pat. No. 5,035,727, it is reported that the temperature at which a membrane separates oxygen from heated, compressed air is the same as that for the gas turbine, which generates power through the expansion of the oxygen-stripped hot compressed air. With such an arrangement, either turbine efficiency is decreased (due to power generation at a lower than desirable temperature) or the SELIC membrane is operated at a higher temperature than that desired for optimal chemical and mechanical integrity.

OBJECTS OF THE INVENTION

It is therefore an object of the invention to provide methods which utilize high combustor temperatures reached by a power generation system to drive an oxygen production system at acceptable operating temperatures for both systems.

It is a further object of the invention to provide such a method which efficiently produces both oxygen and power as products.

SUMMARY OF THE INVENTION

This invention comprises combusting a compressed gas stream in a combustor, contacting the combusted, compressed gas stream with a solid electrolyte ionic or mixed conductor membrane to produce an oxygen-depleted, compressed gas stream and product oxygen therefrom, and expanding the oxygen-depleted, compressed gas stream recovered from the solid electrolyte membrane in a gas turbine. Power is generated by expansion of the gas stream within this gas turbine and/or the use of heat to produce steam. Preferably, a second combustor combusts the oxygen-depleted, compressed gas stream prior to expansion thereof.

In some embodiments, alternative pathways partially bypass the main pathway when adjustments to variables, such as gas stream flow rate, oxygen content and temperature, are desirable.

The term "SELIC" as used herein refers to solid electrolyte ionic or mixed conductors that can transport oxide ions.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
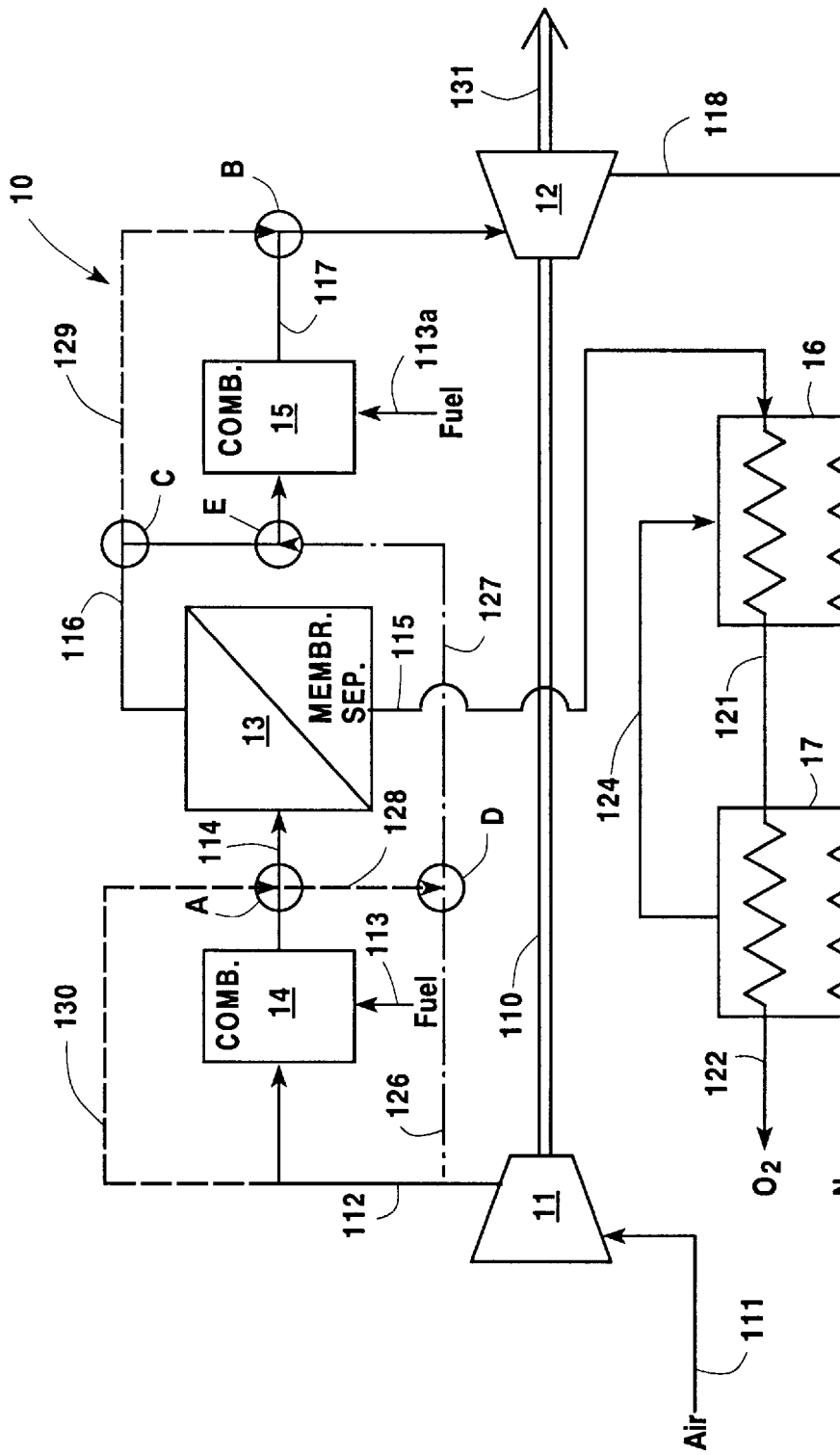
FIG. 1 is a schematic representation of a system for producing oxygen and generating power according to this invention in which heat is recovered from the SELIC permeate product and/or the gas turbine exhaust to form steam for subsequent use.

The methods of the present invention produce product oxygen and generate power by integrating a SELIC membrane system with a gas turbine system. The SELIC membrane oxygen-producing system and the gas turbine power-generating system are operated at temperatures that optimize their respective performances. One or more combustors are efficiently utilized to heat gas streams to desired temperatures. SELIC membranes utilizable according to the present invention are discussed in more detail in Tables 2 and 3 and accompanying text below.

While the present invention is applicable generally to oxygen production and power generation from any oxygen-containing gas, the invention may be practiced preferably with respect to oxygen production and power generation from air. Product oxygen as used herein refers to oxygen having a purity of at least about 90%, preferably at least about 95%, and more preferably at least about 98%.

In the Figures, solid lines represent the main pathway of the particular embodiment, and dashed or dot-dashed lines represent alternative pathways, which bypass some of the main pathway, that may be followed to achieve certain benefits of the respective embodiments. In general, approximately 10% to 90% of a flow may traverse one or more of the alternate pathways as described in more detail below.

The methods of this invention may be used with a variety of modifications to the gas turbine power generating cycle. System 10, FIG. 1, includes a SELIC membrane in a separator unit 13 is integrated with a gas turbine for oxygen production and power generation according to this invention. In this embodiment, heat may be recovered from the SELIC permeate product and/or the gas turbine exhaust to form steam as stream 125 for passage through a conduit to a Rankine power generation cycle.

Gas stream 111 is compressed in compressor 11 to produce compressed gas stream 112, having a pressure within the range of from about 100 to about 500 psia, with a pressure within the range of from about 200 to about 400 psia being preferred.

Compressed gas stream 112, which emerges from compressor 11, is passed to combustor 14, where it is combusted to the operating temperature of the SELIC membrane contained in SELIC separator unit 13. This operating temperature is within the range of from about 400° to about 1200° C., with an operating temperature within the range of from about 500° to about 850° C. being preferred.

To reach this SELIC operating temperature, combustor 14 burns fuel 113 supplied thereto. The fuel so supplied may be any convenient fuel, including hydrocarbons, such as natural gas, fuel oils or fuel gas generated from coal. Combusted, compressed gas stream 114 emerges from combustor 14 and enters SELIC separator unit 13. The feed flow of combusted, compressed gas stream 114 to the SELIC membrane directly corresponds to the desired flow of permeate product stream 115.

In SELIC separator unit 13, oxygen is removed from combusted, compressed gas stream 114. The amount of oxygen removed is ordinarily within the range of from about 5% to about 50% of the oxygen content of the oxygen-containing gas. Oxygen stream 115 emerges from SELIC separator unit 13, and then passes through heat exchangers 16 and 17 to yield successively cooler product oxygen streams 121 and 122.

The oxygen-depleted compressed SELIC retentate exhaust gas stream 116, or the SELIC exhaust, emerges from SELIC separator unit 13 and enters combustor 15. In combustor 15, additional fuel 113a is supplied to raise the temperature of oxygen-depleted compressed gas stream 116 to that of the inlet temperature of gas turbine 12. Use of combustor 15 decouples the operating temperature of SELIC separator 13 from that of turbine 12. Heated, oxygen-depleted compressed gas stream 117 exits combustor 15 and enters gas turbine 12 to produce net power 131. The temperature at which gas turbine 12 operates is typically within the range of from about 900° to about 2000° C. for optimum performance, with a temperature of about 1000° to about 1700° C. being preferred.

Combustors 14 and 15 are relatively inexpensive units which achieve the desired amount of heating at a greatly reduced capital cost over heat exchangers with comparable capacity. Further, the heating rate can be controlled more effectively using such a combustor.

In gas turbine 12, heated, oxygen-depleted compressed gas stream 117 is expanded thereby generating power. Gas turbine 12 may be linked to compressor 11 by shaft 110, which is capable of driving compressor 11. Other conventional linkages include a series of gears or an electrical connection. Gas turbine 12 generates sufficient power to provide the called-for power to operate compressor 11, as well as to provide power to other recipients of power as referred to herein.

Like oxygen stream 115, which emerges from SELIC separator unit 13, expanded oxygen-depleted gas stream or gas turbine exhaust 118 may enter heat exchanger 16 to yield cool waste stream 119 which then enter heat exchanger 17 to yield cool waste stream 120.

Water stream 123 may be introduced to heat exchanger 17 to form stream 124, which then enters heat exchanger 16 to produce stream 125. Stream 125 (substantially steam) may be used for passage to a Rankine power generation cycle.

In practice, it may be desirable to bypass portions, typically 10% to 90%, of the feed streams to one or more of combustors 14 and 15 and SELIC unit 13. These alternative pathways are shown in FIG. 1 by dashed and dot-dashed lines. For instance, if too much compressed gas stream is introduced into the combustor from the gas compressor, combustion will occur therein under fuel-lean conditions. If the primary zone of the combustor becomes too fuel lean, the flame becomes unstable. Bypassing a portion of the compressed gas stream allows the conditions within a combustor to be adjusted to an appropriate fuel-to-gas stream ratio for combustion. If the flow of the compressed gas stream into the combustor is too high, a portion thereof may be split off and introduced to the second combustor downstream of the combustor and the SELIC separator.

In the situation where the oxygen level in the second combustor, combustor 15, is insufficient to maintain adequate combustion of the gas stream entering therein, a portion of the gas stream emerging from compressor 11 may bypass combustor 14 as well as SELIC separator unit 13. By so doing, the oxygen content of the gas stream is maintained as it enters the second combustor. Thus, it is seen that these alternative pathways allow for desirable temperatures, oxygen contents and flow rates to be achieved and maintained throughout the processes and systems of this invention.

In one such alternative pathway, a portion of the feed flow 130 bypasses combustor 14, and the remaining portion of the feed flow 112 passes through that combustor. Use of feed flow 130 enables the exit temperature of combustor 14 to be hotter, providing more stable and efficient combustion. Downstream of combustor 14, the two portions are then combined through a valve at encircled point A, where cooler stream 114 proceeds into SELIC separator unit 13. Alternatively, stream 128 splits off at encircled point A and travel to encircled point D for combination with bypassed stream 126. Thereafter, stream 127 may proceed to encircled point E for combination with oxygen-depleted compressed gas stream 116, where the combined stream enters combustor 15. In other construction, oxygen-depleted compressed gas stream 116 may split off at encircled point C, with stream 129 bypassing combustor 15 and then combining at encircled point B with stream 117, which emerges from combustor 15. By so partially bypassing either combustor 14, combustor 15 or both, higher fuel/oxidant ratios may be achieved in the combustor(s) thereby maintaining a more stable operation of the combustor. One or both of combustors 14, 15 are thereby operated at higher temperatures than that of SELIC separator unit 13.

The use of stream 127 to supplement or replace stream 116 may be advantageous where it is desirable to increase the oxygen content of the feed stream to combustor 15. This is so because stream 127 contains a higher oxygen content than stream 116, which emerges from SELIC separator unit 13, as stream 127 is not introduced into SELIC separator unit 13. By so choosing this alternative pathway, it may be possible to reduce the size of combustor 14 and still maintain optimum operating conditions.

The ratio of stream 127 (bypassed portion) to stream 112 (main portion) may depend on a variety of factors, such as noted above, including the desirability of improving the fuel/oxidant ratio in combustor 15. This may be accomplished by supplementing, or even replacing, oxygen-depleted compressed gas stream 116 with a portion of the feed stream to combustor 14. The supplemented or replaced portion may be split off from feed flow 112 as stream 126 or as stream 128 after the first combustor. Stream 126 bypasses combustor 14, whereas stream 125 emerges from combustor 14 and is therefore combusted to an elevated temperature. In either event, stream 126 and stream 128 have a higher oxygen concentration than oxygen-depleted, compressed gas stream 116, which emerges from SELIC separator unit 13.

Figure 2:
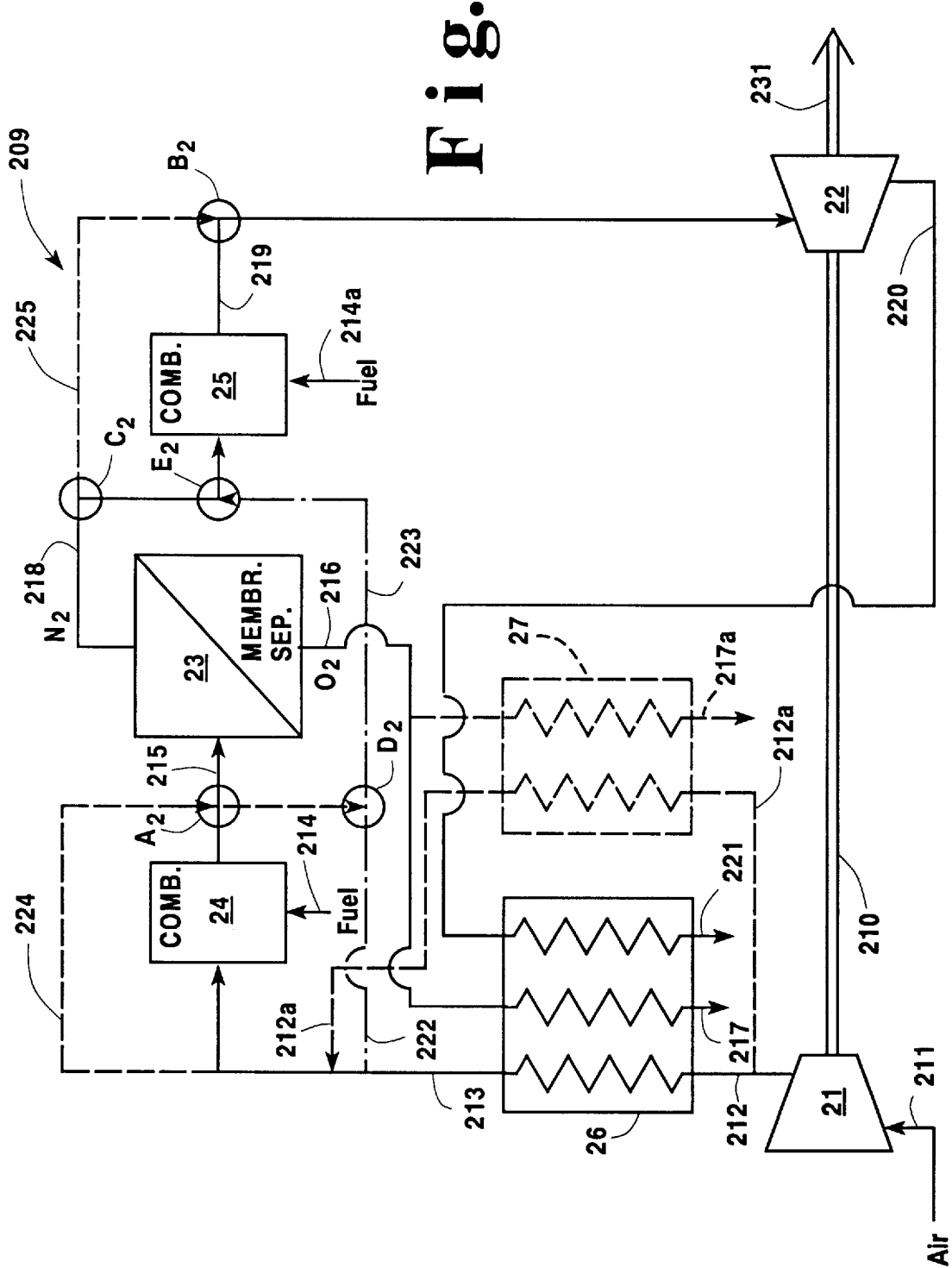
FIG. 2 is a schematic representation of an alternative embodiment in which compressed gas is preheated by passage through a heat exchanger through which the SELIC product and/or the gas turbine exhaust are directed.

In system 209, FIG. 2, a SELIC membrane-containing separator unit is integrated with a gas turbine for oxygen production and power generation according to this invention. A compressed gas stream may be preheated by passage through a heat exchanger in countercurrent flow with the exhaust from the SELIC stage and/or the gas turbine, preferably both. After passage through the heat exchanger, the now-cooled exhaust from the gas turbine may be recovered to form steam for passage to a Brayton power generation cycle.

In this embodiment, gas stream 211 enters compressor 21 for compression to a pressure within the ranges referred to above. Thereafter, compressed gas 212 emerges from compressor 21 and enters heat exchanger 26, where it is preheated in heat exchanger 26 by waste stream 220 and oxygen stream 216.

After emerging from heat exchanger 26, preheated compressed gas stream 213 has a temperature within the range of from about 300° to about 800°, preferably about 400° to about 650°, and then enters combustor 24. Therein, stream 213 is combusted with fuel 214 to achieve the operating temperature of the SELIC membrane, which temperature is referred to above. To reach this temperature, combustor 24 burns fuel 214 supplied thereto.

Combusted, compressed gas stream 215 emerges from combustor 24 and enters SELIC separator unit 23. In SELIC separator unit 23, oxygen is ordinarily removed from stream 215 within the range of about 5% to about 50% of oxygen contained in stream 215. The feed flow to the SELIC separator unit 23 should be within that percentage ratio of the feed flow to the gas turbine referred to above.

Oxygen stream 216 emerges from SELIC separator unit 23, and then passes through heat exchanger 26. In heat exchanger 26, heat is added to the compressed gas stream 212 by oxygen stream 216, to yield cooler product oxygen 217. Alternatively, oxygen stream 216 is cooled in a separate heat exchanger 27 to form product oxygen 217a and to warm a portion of 212a of compressed feed stream 212. This may be desirable to reduce the size of the heat exchanger handling high temperature, high purity oxygen stream 216, which may adversely react with certain materials.

The oxygen-depleted compressed gas stream 218 emerging from SELIC separator unit 23 then enters combustor 25. In combustor 25, additional fuel 214a is supplied to raise the temperature of oxygen-depleted compressed gas stream 218 to that of the inlet temperature of gas turbine 22. Here, that temperature is within the range of from about 900° C. to 2000° C., preferably about 1000°–1700° C. Combusted, oxygen-depleted compressed gas stream 219 emerges from combustor 25 and enters gas turbine 22.

In gas turbine 22, combusted, oxygen-depleted compressed gas stream 219 is expanded thereby generating net power 231. As in FIG. 1, the embodiment depicted in FIG. 2 shows gas turbine 22 linked to compressor 22 by shaft 210, which is capable of driving compressor 22.

Like oxygen stream 216, which emerges from SELIC separator unit 23, expanded, oxygen-depleted gas stream 220 (or the gas turbine exhaust) emerges from gas turbine 22 and enters heat exchanger 26 to yield cool, waste stream 221. Stream 221 may be used to generate steam for passage to a Rankine power generation cycle.

As with system 10, FIG. 1, all of preheated, compressed gas stream 213, FIG. 2, may enter combustor 24, with resulting combusted, compressed gas stream 215 passed to SELIC separator unit 23. Alternatively, a portion 224 of stream 213 may bypass combustor 24, with the remaining portion passed through combustor 24 and emerging as combusted stream 215. The two portions may then be combined at encircled point $A_2$. Thereafter, the combined portions may proceed to SELIC separator unit 23, or a portion travels to encircled point $D_2$ for combination with bypassed stream 222. Since stream 222 and stream 224 bypass combustor 24, these streams are not combusted, and thus do not attain a temperature beyond that reached in heat exchanger 26. Stream 222 and stream 224 also have a higher oxygen content than stream 215, which emerges from SELIC separator unit 23, because they bypass SELIC separator unit 23. Stream 223 may proceed to encircled point $E_2$ for combination with oxygen-depleted compressed gas stream 218, with the combined stream entering combustor 25.

Stream 225 may be split off from oxygen-depleted compressed gas stream 218 at encircled point $C_2$ and thereby bypass combustor 25. At encircled point $B_2$, stream 225 may be combined with combusted, oxygen-depleted compressed gas stream 219, emerging from combustor 25 and thereafter enter gas turbine 22. As with the first embodiment, by so bypassing either combustor 24, combustor 25 or both, higher fuel/oxidant ratios may be achieved in the combustor(s), and desired temperature control can be achieved at the inlet of the SELIC unit or the gas turbine.

Table 1 shows certain production parameters concerning the production of 1,000,000 NCFH (normal cubic feet per hour) of oxygen from the process and system depicted schematically in FIG. 2. For this example, the SELIC membrane operates at a preferred temperature of about 1470° F. This temperature is higher than the temperature of the feed gas stream 213 emerging from the recovery heat exchanger 26 (about 880° F.), but lower than the inlet temperature of the gas turbine 22 (about 2000° F.). The temperature of stream 212 is elevated to the operating temperature of the SELIC separator unit 23 by passage through combustor 24.

TABLE 1

| | |
|---|---|
| Flowrate of feed gas 211 | 11.2 × 10⁶ NCFH |
| Fuel type | natural gas |
| Fuel Flow 214 to combustor 24 | 1.56 × 10⁵ NCFH |
| Fuel Flow 214a to combustor 25 | 1.4 × 10⁵ NCFH |
| Oxygen flow 216 from SELIC membrane | 1 × 10⁶ NCFH |
| Exhaust gas temperature of stream 221 after exchanger 26 | 730° F. (388° C.) |
| Feed gas 211 temperature to compressor | 70° F. (21° C.) |
| Feed Gas 213 temperature after exchanger 26 | 880° F. (471° C.) |
| Temperature 215 after combustor 24 | 1470° F. (800° C.) |
| Temperature 219 after combustor 25 | 2000° F. (1094° C.) |
| Turbine exhaust 220 temperature | 900° F. (483° C.) |
| Pressure of feed 212 after compressor 21 | 12 atm |
| Pressure of O₂ product stream 216 | 1 atm |
| Turbine exhaust pressure 220 | 1 atm |
| Isentropic eff. of compressor 21 | 86% |
| Isentropic eff. of turbine 22 | 88% |
| Exchanger 26 effectiveness | 90% |
| Lower heating value of fuel | 900 BTU/NCFH |
| Power output from turbine 22 | 73.3 Mw |
| Power consumed by compressor 21 | 40.9 Mw |
| Portion of power for oxygen generation | 3.7 Mw |
| Net power output 231 | 32.4 Mw |

Figure 3:
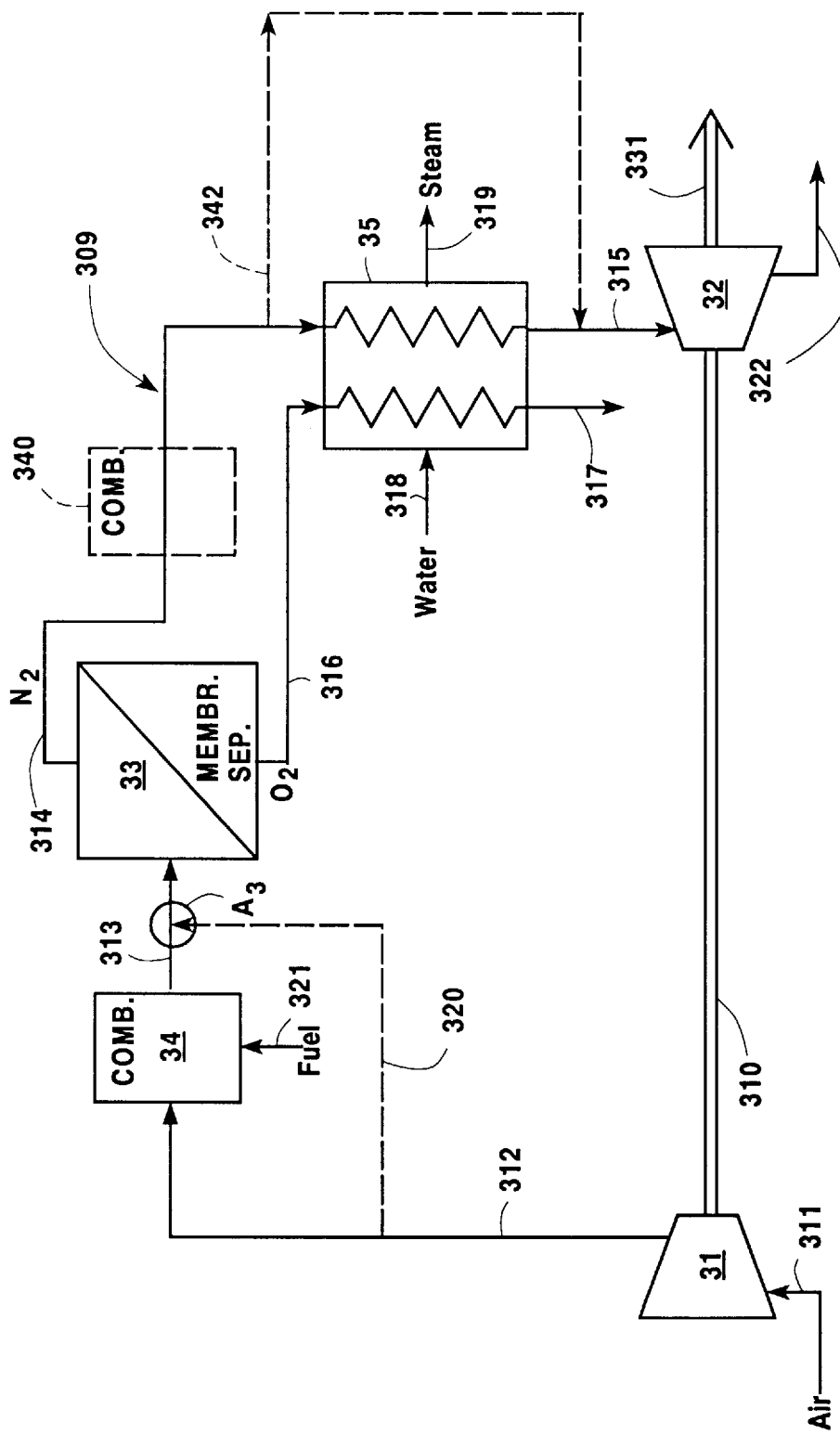
FIG. 3 is a schematic representation of a third embodiment having a single combustor in which a heat exchanger recovers heat from the SELIC permeate product and retentate exhaust prior to passage to the gas turbine to generate steam for subsequent use and to lower the turbine inlet temperature.

System 309, FIG. 3, includes a SELIC membrane integrated with a gas turbine for oxygen production and power generation according to this invention. In this embodiment, a heat exchanger is used to recover heat from the SELIC exhaust prior to passage to the gas turbine for expansion. The heat recovered is used to generate steam for a Rankine or other power generation cycle.

System 309 lacks a second combustor downstream of the SELIC stage. Gas stream 311 is compressed by compressor 31 to an operating pressure within the range of from about 100 to about 500 psia, with about 200–400 psia being preferred. The compressed gas stream 312 emerging from compressor 31 enters combustor 34, where the temperature of that stream is raised to the operating temperature of the SELIC membrane (referred to above) through the burning of fuel 321 supplied to combustor 34. The combusted, compressed gas stream 313 emerging from combustor 34 enters SELIC separator unit 33, where typically 10–80% of the oxygen contained in stream 313 is removed. Again the amount of oxygen removed and recovered may depend on the oxygen content of the oxygen-containing gas. The oxygen-depleted gas stream 314 and oxygen stream 316 exiting SELIC separator unit 33 enter heat exchanger 35. Cool product oxygen 317 emerges from heat exchanger 35.

Water stream 318 enters heat exchanger 35, and a portion of the heat from stream 314 and stream 316 generates steam stream 319. That recovered heat may be used for power generation in connection with a Rankine or other power generation cycle. In one construction, heat exchanger 35 is comprised of two or more heat exchangers, and the oxygen and waste stream are passed through different exchangers.

The cool, oxygen-depleted gas stream 315 emerges from heat exchanger 35 and enters gas turbine 32, where it is expanded for power generation, primarily to drive the air compressor 31. Gas turbine 32 is linked to compressor 31 by shaft 310, which is capable of driving compressor 31.

In practice, it may be desirable to increase the amount of oxygen in the feed stream to SELIC separator unit 33 because a portion of the oxygen in compressed gas stream 312 is used in combustor 34. Thus, supplementing or replacing combusted, compressed gas stream 313 at encircled point $A_3$ with a portion 320 of feed stream 312, which bypasses combustor 34, achieves that goal. Since stream 320 bypasses combustor 34, its oxygen content is greater than stream 313, which emerges from combustor 34.

System 309 preferably maximizes oxygen production for a given feed flow 311 while producing stream 319 for subsequent use and, to a lesser degree, producing net turbine power 331. Turbine 32 is an inexpensive turboexpander which is utilized primarily to drive compressor 31. Alternatively, partial or total bypass 342 regulates turbine inlet temperature and increases net power 331. In yet another construction, a second, optional combustor 340 and associated fuel input generates additional steam, and enables additional work to be obtained from turbine 32 due to increased mass flow from the second combustion. Moreover, combustor 340 utilizes oxygen remaining in retentate exhaust stream 314.

Figure 4:
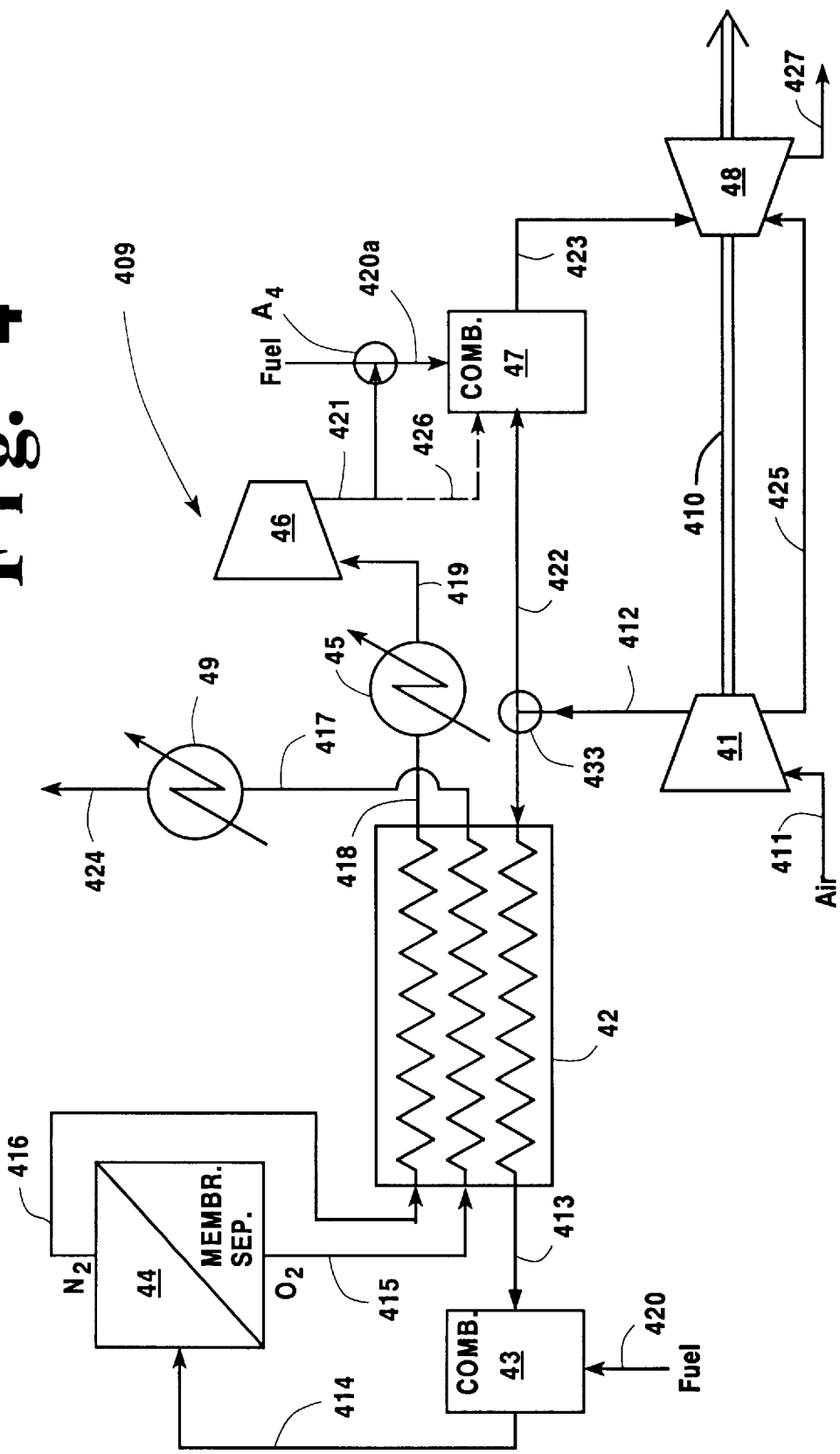
FIG. 4 is a schematic representation of a fourth embodiment in which an existing power generation system is retrofitted with a SELIC system including a compressor to raise the pressure of the SELIC retentate exhaust to match the pressure of the compressed air stream.
Figure 5:
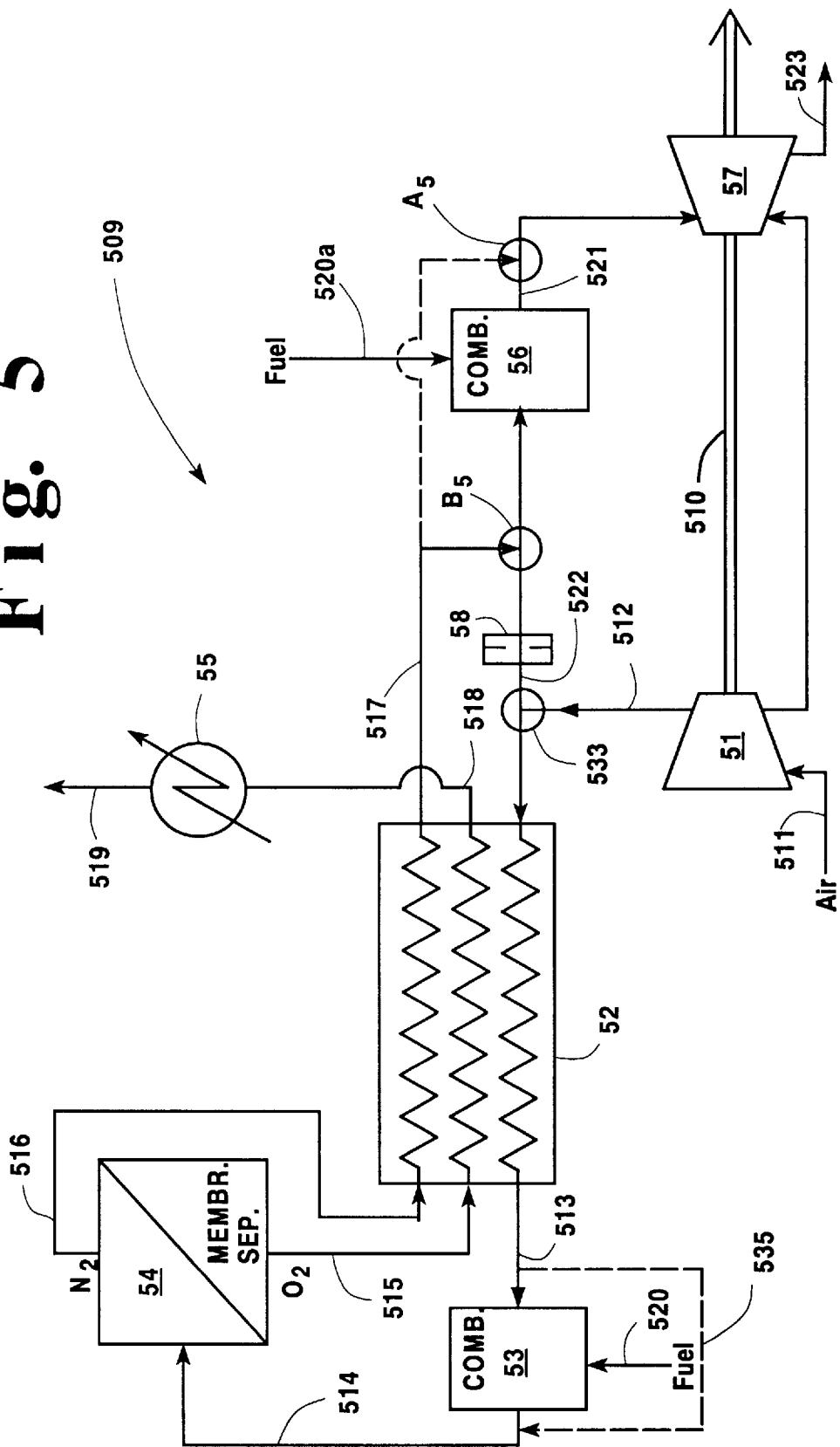
FIG. 5 is a schematic representation of a fifth embodiment in which an existing power generation system is retrofitted with a SELIC system with a pressure reducing element to match the pressure of the SELIC retentate exhaust.
Figure 6:
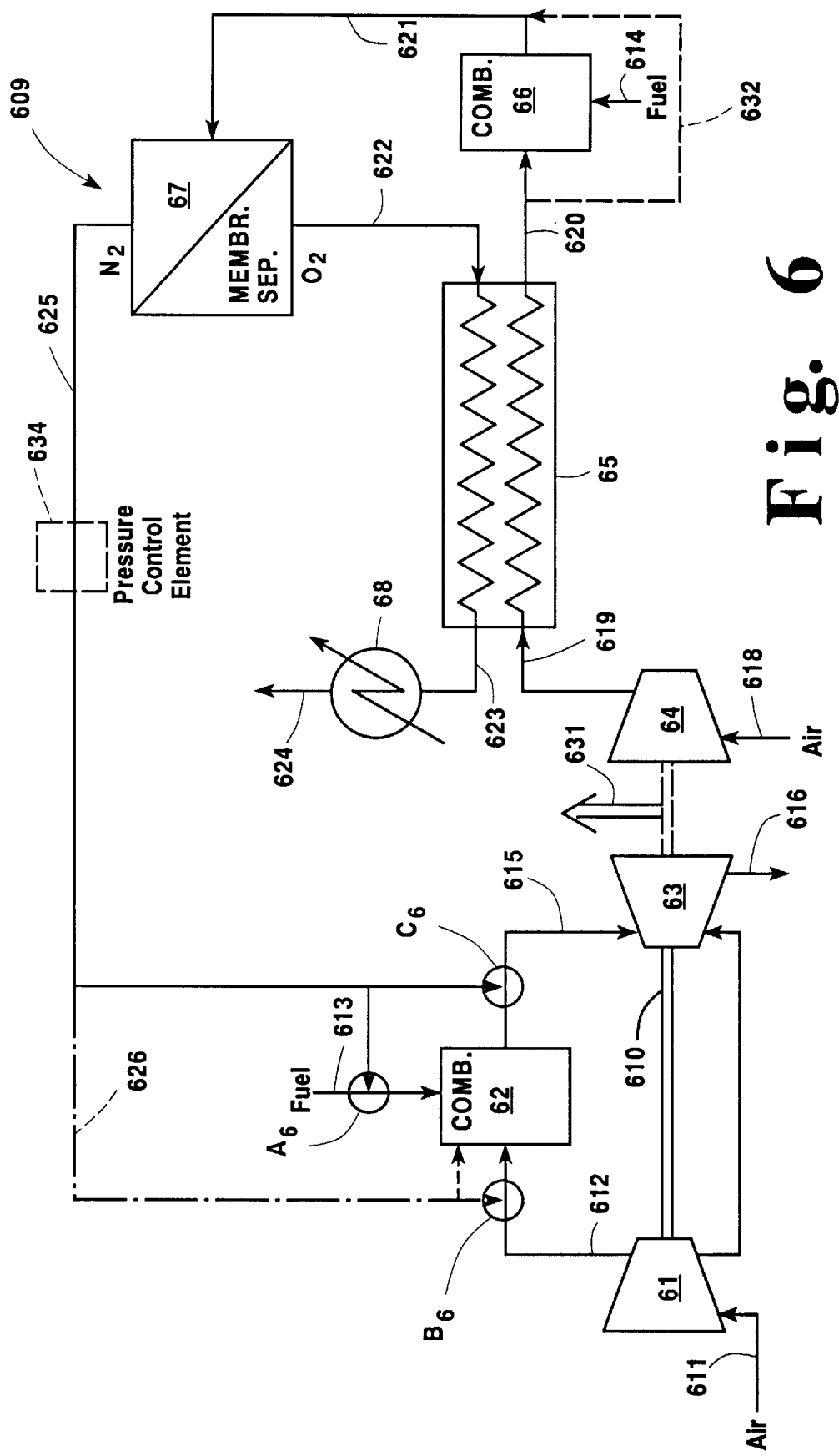
FIG. 6 is a schematic representation of a sixth embodiment in which an existing power generation system is retrofitted with a SELIC system wherein additional air is compressed using a second compressor mechanically linked to the gas turbine of the power generation system and introduced to the SELIC system for oxygen production, and the SELIC retentate exhaust is introduced back into the gas turbine.

In systems 409, 509 and 609, FIGS. 4 through 6, existing, conventional power generation systems are retrofitted with a SELIC system in accordance with the present invention. The SELIC system includes an additional combustor which can be referred to either as a first combustor relative to the SELIC membrane or as a second combustor relative to the combustor in the power generation system.

In FIG. 4, an existing gas turbine power generating system comprising compressor 41, combustor 47, turbine 48 and shaft 410, is retrofitted with a SELIC system, with an additional compressor 46 compressing the SELIC retentate exhaust to an appropriate pressure for expansion in the gas turbine. The compressed SELIC exhaust is used, after combustion in a combustor 47 to an appropriate temperature, for expansion in a turbine to produce power.

Gas stream 411 is initially compressed in compressor 41. Here, the operating pressure of the SELIC membrane is within the range referred to above. A portion of the compressed gas stream enters recovery heat exchanger 42 and is preheated therein to a temperature within the range of about 300° C. to about 800° C. as steam 413. The remaining portion 422 of compressed gas stream 412, as regulated by control valve 433, enters combustor 47. Heated, compressed gas stream 413 emerges from heat exchanger 42, and enters combustor 43. In combustor 43, that gas stream is combusted with fuel 420, and combusted, compressed gas stream 414 emerges therefrom having a temperature comparable to the operating temperature of the SELIC membrane, which temperature is referred to above. To reach this temperature, combustor 43 burns fuel 420 supplied thereto. Combusted, compressed gas stream 414 emerges from combustor 43 and enters SELIC separator unit 44.

Oxygen stream 415 is removed from combusted, compressed gas stream 414 by contacting that stream with the SELIC membrane contained in SELIC separator unit 44. Oxygen-depleted compressed gas stream 416 emerges from SELIC separator unit 44, and enters recovery heat exchanger 42 for cooling purposes. Stream 418 emerges thereafter, and enters heat exchanger 45 for further cooling. Heat exchanger 45 decreases the inlet temperature to accommodate the maximum temperature acceptable to device 46.

Cool, waste stream 419 (at about ambient temperature) enters booster device 46 for compression to match the pressure of stream 422. Device 46 is a low-pressure-ratio compressor or blower which prevents backflow by compensating for the pressure drop inherent in heat exchanger 42 and other components in the SELIC system. Control valve 433 can be omitted when device 46 is properly sized to accommodate the desired flows.

The cool, compressed waste stream 421 may then be combined with fuel 420a at encircled point $A_4$, where the combined stream enters combustor 47 for combustion to raise the temperature of that waste stream to the operating temperature of gas turbine 48, which temperature is within the range of from about 900° to about 2000° C. The remaining portion of feed gas stream 412, as stream 422, also enters combustor 47 for combustion to the operating temperature of gas turbine 48. Combustion stream 423 emerges from combustor 47 and enters gas turbine 48.

In gas turbine 48, combusted stream 423 is expanded thereby generating power. Gas turbine exhaust 427 may be used to recover additional energy. Here again gas turbine 48 may be linked to compressor 41 by shaft 410, which is capable of driving compressor 41.

The oxygen stream 415 is cooled in recovery heat exchanger 42 and emerges therefrom as cooled oxygen stream 417. Cooled oxygen stream is further cooled by heat exchanger 49, and is recovered as product oxygen 424 (at about ambient temperature).

The waste stream 421 may also enter combustor 47 directly from booster compressor 46 as stream 426 through a gas nozzle, without first being combined with fuel 420a prior to entering combustor 47. In yet another construction, bypass stream 425 enables increased flow to turbine 48 to prevent overloading of combustor 47 and to decrease the turbine inlet temperature.

System 509, FIG. 5, integrates a conventional gas turbine power generating system with a SELIC stage for oxygen production and power generation according to this invention. Unlike system 409, however, a SELIC exhaust compressor is not provided.

Gas stream 511, FIG. 5, is compressed in compressor 51. The operating pressure here, like in the fourth embodiment, is within the range of from about 100 to about 500 psia, with about 200–400 psia being preferred. Compressed gas 512 emerges from compressor 51. A portion of that gas stream (up to about 50%) is directed by a control valve 533 to enter recovery heat exchanger 52, and is preheated therein to a temperature within the range of from about 300° C. to about 800° C. Heated, compressed gas stream 513 emerges from recovery heat exchanger 52 and enters combustor 53. In combustor 53, fuel 520 is supplied so that combustion of the heated stream may occur to raise the temperature of the gas stream emerging from combustor 53 to the operating temperature of the SELIC membrane, which temperature is referred to above. In one construction, bypass 535 optimizes operation of combustor 53.

Upon emerging from combustor 53, combusted stream 514 enters SELIC separator unit 54, where 10%–80% of the oxygen contained in stream 514 is extracted.

From SELIC separator unit 54, oxygen-depleted compressed gas stream 516 enters recovery heat exchanger 52 for cooling purposes. The heat from stream 516 is exchanged with stream 512, which, as noted above is preheated thereby. Stream 517 emerges from heat exchanger 52 and may be combined at encircled point $A_5$ with stream 521, which emerges from combustor 56. Alternatively, stream 517 may be combined with compressed gas stream 522 at encircled point $B_5$ upstream from combustor 56. In this alternative pathway, all the gas stream entering gas turbine 57 is further combusted by combustor 56 to the gas turbine operating temperature. This alternative pathway may be advantageous where the pressure of the feed stream to combustor 56 is desirably controlled, such as through the use of flow control device 58. In one construction, device 58 is a plate with an orifice sized to reduce the pressure of stream 522 to match the pressure of stream 517. By so controlling the flow of the feed stream to combustor 56, the need for an additional heat exchanger (such as exchanger 45, FIG. 4) and a gas compressor for pressure adjustments is obviated.

The combined stream from either the main or the alternative pathway then enters gas turbine 57. Therein, expansion of stream 521 occurs thereby generating power. Gas turbine exhaust 523 may be used to recover additional energy. In this retrofit embodiment, gas turbine 57 may also be linked to compressor 51 by shaft 510, which is capable of driving compressor 51.

Oxygen stream 515 also emerges from SELIC separator unit 54 and enters recovery heat exchanger 52 for cooling purposes. Oxygen stream 518 emerges therefrom, is further cooled by passing through heat exchanger 55 and is recovered as product oxygen 519.

Like system 409, in the alternative pathway leading to compressed gas expansion within the gas turbine, the remaining portion 522, FIG. 5, of compressed gas stream from compressor 51 is combusted in combustor 56 to raise the temperature of the gas stream emerging from combustor 56 to within the range of from about 900° C. to about 2000° C. Here, however, flow control device 58 may be inserted before combustor 56. As indicated above, the amount of the compressed feed stream diverted to the SELIC membrane may be adjusted upstream of combustor 56 using flow control device 58 which controls the pressure drop in the stream 522. Thus, the remaining portion 522 of compressed gas may be combined with waste stream 517 from the SELIC membrane at encircled point B downstream of flow control device 58 and upstream of combustor 56.

In system 609, FIG. 6, gas stream 611 is compressed in compressor 61 to a pressure within the range of from about 100 to about 500 psia. From compressor 61 emerges compressed gas stream 612, which enters combustor 62, as does fuel 613.

In combustor 62, compressed gas stream 612 is combusted to raise the temperature of the combusted stream emerging therefrom to the operating temperature of gas turbine 63. Here, that temperature is within the range of from about 900° C. to about 2000° C. From combustor 62, combusted, compressed gas stream 615 enters gas turbine 63, where it is expanded to generate power. Gas turbine 63 is shown linked to compressor 61 by shaft 610, which is capable of driving compressor 61. The exhaust 616 from gas turbine 63 may be used by a heat recovery steam generator to recover additional energy.

A second gas compressor 64 compresses a second feed gas stream 618 prior to introduction to SELIC separator unit 67. Compressed gas 619 emerges from compressor 64 and enters recovery heat exchanger 65. Heated, compressed gas 620 emerges therefrom and enters combustor 66, where it is further heated to the operating temperature of the SELIC membrane. Here, that temperature is typically above 400° C. and more typically above 600° C. Fuel 614 is supplied to combustor 66 to assist in elevating the temperature of compressed gas stream 620 to heated stream 621. Preferably, the flow rate of stream 621 is 5% to 25% of stream 615 entering turbine 63.

From combustor 66, combusted stream 621 emerges and enters SELIC separator unit 67. In SELIC separator unit 67, oxygen is removed from that stream in an amount typically ranging from 10–80% of the oxygen contained therein. The oxygen stream 622 that emerges therefrom is then cooled in recovery heat exchanger 65. The resulting cool oxygen stream 623 is further cooled by heat exchanger 68, and is then recovered as product oxygen 624.

The oxygen-depleted compressed gas stream emerging from SELIC separator unit 67 is combined with fuel stream 613 at encircled point $A_6$ for entry into combustor 62. Therein, it is combined with compressed gas stream 612 for combustion prior to entering gas turbine 63. These gas turbine systems operate under standard conditions.

As in system 509, FIG. 5, when a SELIC membrane is integrated with a gas turbine in this manner, power generated by the gas turbine may be used to operate the gas compressor 61, FIG. 6, for the SELIC membrane, through a shaft 610 linking those units. In one construction, turbine 63 is also mechanically linked to second compressor 64, and generates net power 631.

Optionally, a portion 626 of oxygen-depleted compressed gas stream 625 may be combined with compressed gas 612 before entry into combustor 62 (see encircled point $B_6$) or with the combusted, compressed gas, which emerges from combustor 62 (see encircled point $C_6$). This is advantageous because additional flexibility is provided for the desired temperature, diluent level and oxygen concentration in the system either before or after the combustor. Also, a portion 632 of stream 620 can bypass combustor 66 as desired.

In one construction, SELIC unit 67 is operable at a different pressure than the operating pressure of turbine 63 through control by pressure control element 634, shown in phantom in stream 625. When element 634 is a flow control plate, SELIC unit 67 is operated at a higher pressure than that of turbine 63. When element 634 is a compressor or blower, SELIC unit 67 is operable at a decreased relative pressure.

Existing gas turbine power generating systems retrofitable with a SELIC system according to the present invention include those available from General Electric Co., Schenectady, N.Y., Siemens, Germany, or ABB, Sweden. Modifications to these gas turbine systems are minimal, including addition of a gas stream feed to the SELIC stage and a SELIC exhaust feed to a combustor that provides gas turbine expansion.

While it is ordinarily undesirable to operate the gas turbine above its capacity, adjustments to the flow rates can be made to mitigate this effect. For instance, the flow of compressed gas from compressor 61 may be decreased to compensate for the increased flow of the oxygen-depleted gas 625 emerging from the SELIC membrane. When that compressed gas flow cannot be decreased sufficiently, either a portion of the oxygen-depleted gas flow emerging from the SELIC membrane should be vented or the compressed gas feed to the SELIC membrane should be decreased. The maximum feed flow to the SELIC membrane is determined by the power used to compress the feed stream therefor. As the system is a net power generating system, the SELIC membrane should use less power than is generated by the system.

The SELIC membranes employed herein are constructed of dense, ceramic oxides or mixtures of oxides, characterized by oxygen vacancies in their crystal lattice caused by defects or the introduction of dopants (such as, Y, Sr, Ba, Ca and the like). A vacancy diffusion mechanism is the means by which oxygen ions are transported through the crystal lattice. In general, elevated temperatures (400° C. to 1200° C., such as within the range of from about 500° to about 1000° C., preferably within the range of about 600° to about 800° C.) should be maintained during operation to achieve high mobilities of the vacancies. Large vacancy concentrations combined with high mobilities of the vacancies form the basis for rapid oxygen ion transport through the materials from which the SELIC membranes are constructed. Since only oxygen ions may occupy the crystal lattice, the ideal SELIC membranes possess infinite oxygen selectivity.

The SELIC membranes suitable for use herein may be constructed from materials that are mixed conductors and which do not require an external circuit to facilitate electron movement. Examples include dual-phase membranes. Uses of different combinations of SELIC membranes are disclosed in U.S. Ser. No. 08/444,354, filed May 18, 1995, entitled "Pressure Driven Solid Electrolyte Membrane Gas Separation Method", which is incorporated herein by reference.

Different types of SELIC materials may be employed keeping with the spirit of the present invention. For instance, the SELIC membrane may be comprised of a material that is primarily an oxygen ion conductor, such as yttria-stabilized zirconia ("YSZ"), sandwiched between two porous electrodes. In practice, oxygen molecules diffuse through one of the porous electrodes to the electrolyte surface, at which point dissociation into oxygen ions occurs. That first porous electrode provides electrons for the process. The oxygen ions diffuse through the electrolyte and reach the second porous electrode, where recombination occurs thereby forming oxygen molecules and releasing electrons in the process. The electrons are returned to the first porous electrode for oxygen ionization by an external circuit.

As an alternative, the SELIC membrane used in this invention may be comprised of a material that conducts both oxygen ions and electrons. Such materials are often referred to as mixed conductors. For mixed-conductor SELIC membranes, electrons are returned to the high oxygen partial pressure side of the SELIC membrane by electronic conduction through the SELIC membrane itself thereby obviating the need for an external circuit.

SELIC membranes themselves are not to date believed to be commercially available. However, materials used to prepare SELIC membranes are obtainable from Seattle Specialty Chemicals, Woodinville, Wash., for example.

The commercially available materials used to prepare SELIC membranes may be fabricated by conventional techniques, such as extrusion, slip coating, calendaring, dip coating, spin coating and the like into thick self-supporting films, thin films supported on a suitable porous substrate, in disk-like and tubular configurations. The thickness of the SELIC membrane should be below about 5000 μm, with below about 500 μm being preferred and below about 50 μm being more preferred. If the film thickness is large (e.g., above about 1000 μm), the SELIC membrane may be self-supporting.

Alternatively, the SELIC membranes may be in the form of a thin film, which may be supported on a porous support, having a thickness within the range of from about 500 μm to about 5000 μm. Such porous substrates may be constructed of the same material or of different materials than the SELIC membrane itself. The mixed-conductor-type SELIC membranes may be prepared from a variety of materials including those listed in Table 2 below. In Table 2, δ is the deviation from oxygen stoichiometry. In addition, the x and y values may vary with material composition.

TABLE 2

Mixed Conducting Solid Electrolytes

Material composition

1. $(La_{1-x}Sr_x)(Co_{1-y}Fe_y)O_{3-\delta}$ ($0 \leq x \leq 1$, $0 \leq y \leq 1$, δ from stoichiometry)
2. (a) $SrMnO_{3-\delta}$
   (b) $SrMn_{1-x}Co_xO_{3-\delta}$ ($0 \leq x \leq 1$, $0 \leq y \leq 1$, δ from stoichiometry)
   (c) $Sr_{1-x}Na_xMnO_{3-\delta}$
3. (a) $BaFe_{0.5}Co_{0.5}YO_3$
   (b) $SrCeO_3$
   (c) $YBa_2Cu_3O_{7-\beta}$ ($0 \leq \beta \leq 1$, β from stoichiometry)
4. (a) $La_{0.2}Ba_{0.8}Co_{0.8}Fe_{0.2}O_{2.6}$
   (b) $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x, x', x", y, y', y" all in 0–1 range)
   where: A, A', A" = from groups 1, 2, 3 and f-block lanthanides
   B, B', B" = from d-block transition metals

| 6. | (a) | Co—La—Bi type: | Cobalt oxide | 15–75 mole % |
| --- | --- | --- | --- | --- |
|  |  |  | Lanthanum oxide | 13–45 mole % |
|  |  |  | Bismuth oxide | 17–50 mole % |
|  | (b) | Co—Sr—Ce type: | Cobalt oxide | 15–40 mole % |
|  |  |  | Strontium oxide | 40–55 mole % |
|  |  |  | Cerium oxide | 15–40 mole % |
|  | (c) | Co—Sr—Bi type: | Cobalt oxide | 10–40 mole % |
|  |  |  | Strontium oxide | 5–50 mole % |
|  |  |  | Bismuth oxide | 35–70 mole % |
|  | (d) | Co—La—Ce type: | Cobalt oxide | 10–40 mole % |
|  |  |  | Lanthanum oxide | 10–40 mole % |
|  |  |  | Cerium oxide | 30–70 mole % |
|  | (e) | Co—La—Sr—Bi type: | Cobalt oxide | 15–70 mole % |
|  |  |  | Lanthanum oxide | 1–40 mole % |
|  |  |  | Strontium oxide | 1–40 mole % |
|  |  |  | Bismuth oxide | 25–50 mole % |
|  | (f) | Co—La—Sr—Ce type: | Cobalt oxide | 10–40 mole % |
|  |  |  | Lanthanum oxide | 1–35 mole % |
|  |  |  | Strontium oxide | 1–35 mole % |
|  |  |  | Cerium oxide | 30–70 mole % |

7. $Bi_{2-x-y}M'_xM_yO_{3-\delta}$ ($0 \leq x \leq 1$, $0 \leq y \leq 1$, δ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$
9. Dual phase mixed conductors (electronic/ionic):

$(Pd)_{0.5}/(YSZ)_{0.5}$
$(Pt)_{0.5}/(YSZ)_{0.5}$
$(B—MgLaCrO_x)_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}(In_{95\%}Pr_{2.5\%}Zr_{2.5\%})_{0.5}/(YSZ)_{0.5}$

Mixed electronic/ionic conductors of item 9 in Table 2 are dual phase mixed conductors that are comprised of physical mixtures of an ionically-conducting phase and an electronically-conducting phase.

Electrically driven SELIC membranes based on ionic conductors may be selected from the following materials in Table 3:

TABLE 3

Ionic Conductor SELIC Materials

10. $(Bi_2O_3)_x(M_{y1}O_{y2})_{1-x}$
    wherein M may be selected from Sr, Ba, Y, Gd, Nb, Ta, Mo, W, Cd, Er and combinations thereof, and
    x is greater than or equal to 0 and less than or equal to 1.
11. $CaTi_{0.7}Al_{0.3}O_{3-x}$
    wherein x is greater than or equal to 0 and less than or equal to 1.
12. $CaTi_{0.5}Al_{0.5}O_{3-\delta}$
    wherein δ is determined by stoichiometry.
13. $CaTi_{0.95}Mg_{0.05}O_{3-\delta}$
    wherein δ is determined by stoichiometry.
14. $ZrO_2—Tb_4O_7$
15. $ZrO_2—Y_2O_3—Bi_2O_3$
16. $BaCeO_3:Gd$
17. $BaCeO_3; BaCeO_3:Y; BaCeO_3:Nd$
18. $La_xSr_{1-x}Ga_yMg_{1-y}O_{3-\delta}$
    wherein x is greater than or equal to 0 and less than or equal to 1,
    y is greater than or equal to 0 and less than or equal to 1, and
    δ is determined by stoichiometry.

For a given application, the size of the chosen SELIC membrane is typically linked to the flux (i.e., the quantity of oxygen per unit area per unit time) of oxygen therethrough. High values of oxygen flux are desirable so that a smaller SELIC membrane area may be used to efficiently remove oxygen from the heated, compressed gas entering the SELIC separator unit. The smaller SELIC membrane area reduces capital expense. The oxygen flux at any location on the SELIC membrane depends on many factors, including the ionic conductivity of the electrolyte, the thickness of the membrane and the difference in oxygen chemical potential. High ionic conductivity, above about 0.01 S/cm (Siemens/cm), preferably above about 0.1 S/cm and more preferably above about 1.0 S/cm, should provide for optimized performance of the SELIC membrane. Maintaining the SELIC membrane at a sufficiently high temperature (typically above 400° C., more typically above 600° C.) contributes to performance optimization in the process and system of this invention, because the SELIC membrane possesses appreciable oxygen ion conductivity at elevated temperatures and the conductivity increases with increasing temperatures. The higher temperatures may also enhance the kinetics of surface exchange processes at the surfaces of the SELIC membrane.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for producing oxygen and generating power by retrofitting a power generation system, said method comprising the steps of:

providing the power generation system including a first compressor, a first combustor and a gas turbine, said compressor compressing a first oxygen-containing gas stream for delivery to said first combustor, said first combustor combusting the first stream for expansion in said gas turbine;

providing a second combustor in fluid communication with at least a first separator having a solid electrolyte membrane;

directing a minor portion of the first stream to said second combustor utilizing a control valve disposed between said first compressor and said first combustor;

combusting at least the minor portion of the first stream in the second combustor to a temperature below 1100° C. to produce a combusted, heated, compressed gas stream;

contacting the combusted, heated, compressed gas stream with the solid electrolyte membrane at a temperature below about 1000° C. to produce an oxygen-depleted, compressed gas stream and product oxygen therefrom;

combining the oxygen-depleted, compressed gas stream with the first stream at least one of before, during and after combustion of the first stream by said first combustor;

controlling the pressure of the remainder of the first stream after the minor portion is removed, utilizing a pressure matching device in fluid communication between said control valve and said first combustor, said pressure matching device being disposed upstream of the combining of the oxygen-depleted compressed gas stream with the first stream to match the pressure of the controlled first stream with the pressure of the oxygen-depleted stream; and expanding the combined gas stream in the gas turbine at a temperature within the range of from about 900° to about 2000° C., thereby generating power, wherein at least a portion of the compressed oxygen-containing gas stream bypasses the second combustor and is mixed with the combusted, compressed oxygen-containing gas stream prior to contact with the solid electrolyte membrane.

2. The method of claim 1 wherein at least a portion of the oxygen-depleted, compressed gas stream from the solid electrolyte membrane is delivered to the first combustor.

3. The method of claim 1 further including heating the compressed, oxygen-containing gas stream using heat recovered from the product oxygen from the solid electrolyte membrane.

4. The method of claim 1 further including recovering heat from the expanded, oxygen-depleted gas stream obtained from the gas turbine.

5. The method of claim 1 wherein the solid electrolyte membrane and the turbine are operated at pressures within the range of from about 100 to about 500 psia.

6. The method of claim 1 wherein the second combustor heats the compressed, oxygen-containing gas stream to a temperature within the range of from about 400° C. to about 1000° C.

7. The method of claim 1 wherein the pressure matching device is a plate with an orifice sized to reduce the pressure of the remainder of the first stream to match the pressure of the oxygen-depleted stream.

8. A method for producing oxygen and generating power by retrofitting a power generation system, said method comprising:

providing the power generation system including a first compressor, a first combustor and a gas turbine, said compressor compressing a first oxygen-containing gas stream for delivery to said first combustor, said first combustor combusting the first stream for expansion in said gas turbine; providing at least a first separator having a solid electrolyte membrane; heating at least a minor portion of the first stream utilizing at least a first heat exchanger to a temperature below 1100° C. to produce a heated, compressed gas stream having a pressure of at least 100 psia; directing the minor portion of the first stream to said first heat exchanger utilizing a control valve disposed between said first compressor and said first combustor; contacting the heated, compressed gas stream with the solid electrolyte membrane at a temperature below about 1000° C. to produce an oxygen-depleted, compressed gas stream having a pressure of at least 100 psia and product oxygen therefrom; combining the oxygen-depleted, compressed gas stream with the first stream at least one of before, during and after combustion of the first stream by said first combustor; controlling the pressure of the remainder of the first stream, after the minor portion is removed, utilizing a pressure matching device in fluid communication between said control valve and said first combustor, said pressure matching device being disposed upstream of the combining of the oxygen-depleted, compressed gas stream with the first stream to match the pressure of the controlled first stream with the pressure of the oxygen-depleted stream; and expanding the combined gas stream in the gas turbine at a temperature within the range of from about 900° to about 2000° C., thereby driving said first compressor and generating power;

wherein heating the compressed oxygen-containing gas stream is accomplished at least in part using a second combustor to produce a combusted, compressed, oxygen-containing gas stream to serve as the heated, compressed gas stream that is contacted with the solid electrolyte membrane; and wherein at least a portion of the compressed oxygen-containing gas stream bypasses the second combustor and is mixed with the combusted, compressed, oxygen-containing gas stream prior to contact with the solid electrolyte membrane.

9. The method of claim 8 wherein at least a portion of the oxygen-depleted, compressed gas stream from the solid electrolyte membrane is delivered to the first combustor.

10. The method of claim 8 wherein heating the compressed, oxygen-containing gas stream is accomplished at least in part using heat recovered from the product oxygen from the solid electrolyte membrane.

11. The method of claim 8 further including recovering heat from the expanded, oxygen-depleted gas stream obtained from the gas turbine.

12. The method of claim 8 wherein the solid electrolyte membrane and the turbine are operated at pressures within the range of from about 100 to about 500 psia.

13. The method of claim 8 wherein the second combustor heats the compressed, oxygen-containing gas stream to a temperature within the range of from about 400° C. to about 1000° C.

14. The method of claim 8 wherein the pressure matching device is a plate with an orifice sized to reduce the pressure of the remainder of the first stream to match the pressure of the oxygen-depleted stream.

15. A method for producing oxygen and generating power by retrofitting a power generation system, said method comprising:

providing the power generation system including a first compressor, a first combustor and a gas turbine, said compressor compressing a first oxygen-containing gas stream for delivery to said first combustor, said first combustor combusting the first stream for expansion in said gas turbine;

providing at least a first separator having a solid electrolyte membrane;

heating at least a minor portion of the first stream and a compressed oxygen-containing gas stream utilizing at least a first heat exchanger and a second combustor, disposed downstream from said first heat exchanger, to a temperature below 1100° C. to produce a heated, compressed gas stream having a pressure of at least 100 psia;

bypassing at least a portion of the compressed oxygen-containing gas stream to the second combustor and mixing said bypassed portion with the combusted, compressed, oxygen-containing gas stream prior to contact with the solid electrolyte membrane;

directing the minor portion of the first stream to said first heat exchanger utilizing a control valve disposed between said first compressor and said first combustor;

contacting the heated, compressed gas stream with the solid electrolyte membrane at a temperature below about 1000° C. to produce an oxygen-depleted, compressed gas stream having a pressure of at least 100 psia and product oxygen therefrom;

directing both the oxygen-depleted, compressed gas stream and the product oxygen through said first heat exchanger to transfer heat to the compressed oxygen-containing gas stream;

combining the oxygen-depleted, compressed gas stream with the first stream at least one of before, during and after combustion of the first stream by said first combustor;

controlling the pressure of the remainder of the first stream, after the minor portion is removed, utilizing a pressure matching device in fluid communication between said control valve and said first combustor, said pressure matching device being disposed upstream of the combining of the oxygen-depleted, compressed gas stream with the first stream to reduce the pressure of the controlled first stream to match the pressure of the oxygen-depleted stream; and expanding the combined gas stream in the gas turbine at a temperature within the range of from about 900° to about 2000° C., thereby driving said first compressor and generating power.

16. The method of claim 15 wherein the pressure matching device is a plate with an orifice sized to reduce the pressure of the remainder of the first stream to match the pressure of the oxygen-depleted stream.

\* \* \* \* \*